(12) United States Patent
K.N. et al.

(10) Patent No.: US 8,125,223 B2
(45) Date of Patent: Feb. 28, 2012

(54) SEGMENTING INFARCT IN DIFFUSION-WEIGHTED IMAGING VOLUME

(75) Inventors: Bhanu Prakash K.N., Singapore (SG); Varsha Gupta, Singapore (SG); Wieslaw Lucjan Nowinski, Singapore (SG)

(73) Assignee: Singapore Agency for Science, Technology and Research Act, Singapore (SG)

( * ) Notice: Subject to any disclaimer, the term of this patent is extended or adjusted under 35 U.S.C. 154(b) by 242 days.

(21) Appl. No.: 12/311,484

(22) PCT Filed: Oct. 3, 2006

(86) PCT No.: PCT/SG2006/000292
§ 371 (c)(1), (2), (4) Date: Mar. 31, 2009

(87) PCT Pub. No.: WO2008/041946
PCT Pub. Date: Apr. 10, 2008

(65) Prior Publication Data
US 2010/0231216 A1    Sep. 16, 2010

(51) Int. Cl.
*G01V 3/00* (2006.01)
(52) U.S. Cl. ...................................... 324/309
(58) Field of Classification Search .......... 324/300–322; 600/410–435
See application file for complete search history.

(56) References Cited

U.S. PATENT DOCUMENTS
6,853,189 B1    2/2005  Pipe
(Continued)

FOREIGN PATENT DOCUMENTS
WO    WO 02/069799    9/2002
(Continued)

OTHER PUBLICATIONS

Ying Han et al., "The Application of Diffusion—and Perfusion—Weighted Magnetic Resonance Imaging in the Diagnosis and Therapy of Acute Cerebral Infarction", International Journal of Biomedical Imaging, vol. 2006, Article ID 20164, pp. 1-11.

Extended European Search Report and European Search Option dated Jan. 27, 2011 on European Patent Application No. EP 06799855.9.

Nowinski W L, et al. "Design and development of a computer aided diagnosis processing of acute ischemic stroke MR images", WSEAS Transactions on Biology and Biomedicine WSEAS Greece, vol. 3, Issue 6, Jun. 2006, pp. 401-407, XP007916721.

(Continued)

*Primary Examiner* — Dixomara Vargas
(74) *Attorney, Agent, or Firm* — Wood, Phillips, Katz, Clark & Mortimer

(57) ABSTRACT

Methods (2900), apparatuses (3000), and computer program products for segmenting an infarct in a diffusion-weighted imaging (DWI) volume are disclosed. A Region of Interest in at least one slice of the DWI volume is selected (2912). The ROI comprises at least a portion of the slice. A threshold for a minimum size of an infarct region is selected (2916). An energy mask is convolved (2918) with that slice, and the resulting energy image is normalized (2920). The ROI in the convolved energy image is selected (2922). An initial threshold is determined (2924) using a histogram of the ROI of the slice without a background region, and an initial segmentation of the slice is performed (2926). Individual components of the initial segmentation of the slice are labeled (2930). A final threshold is determined (2932) using histograms of labeled components if the initial segmentation, and a final segmentation if the slice is performed (2934) using that threshold.

84 Claims, 18 Drawing Sheets

U.S. PATENT DOCUMENTS

| | | | |
|---|---|---|---|
| 7,184,814 B2 * | 2/2007 | Lang et al. | 600/416 |
| 7,783,132 B2 * | 8/2010 | Nowinski et al. | 382/294 |
| 2007/0014453 A1 * | 1/2007 | Nowinski et al. | 382/128 |
| 2007/0015995 A1 * | 1/2007 | Lang et al. | 600/407 |
| 2007/0203430 A1 * | 8/2007 | Lang et al. | 600/587 |
| 2009/0076371 A1 * | 3/2009 | Lang et al. | 600/407 |
| 2010/0040264 A1 * | 2/2010 | Volkau et al. | 382/128 |
| 2010/0290689 A1 * | 11/2010 | Gupta et al. | 382/131 |

FOREIGN PATENT DOCUMENTS

| | | |
|---|---|---|
| WO | WO 2004/086297 | 10/2004 |

OTHER PUBLICATIONS

Hu, Qingmao, et al. "Supervised range-constrained thresholding", IEEE Transactions on image processing, IEEE Service Center, Piscataway, NJ, US, vol. 15, Issue 1, Jan. 1, 2006, pp. 228-240, XP002561671.

Hu, et al. "Fast connected-component labeling in three-dimensional binary images based on iterative recursion", Computer Vision and Image Understanding, Academic Press, US vol. 99, Issue 3, Sep. 1, 2005, pp. 414-434, XP005012076.

* cited by examiner

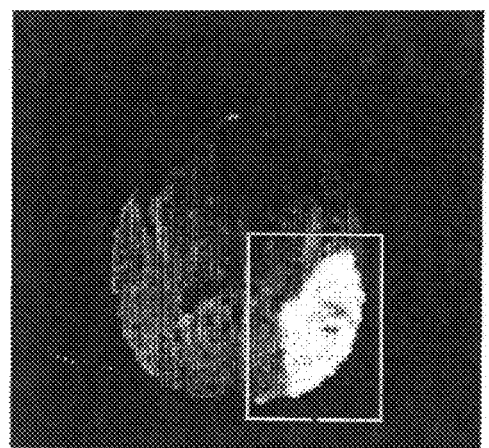
FIG. 4A  FIG. 4B
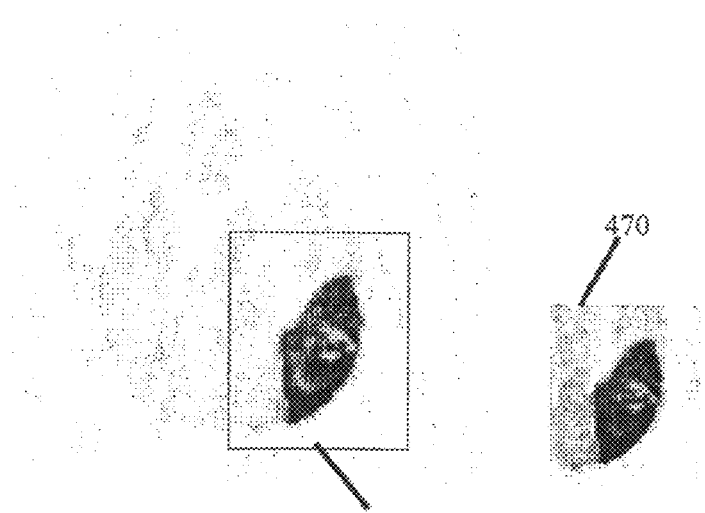
FIG. 4C  FIG. 4D

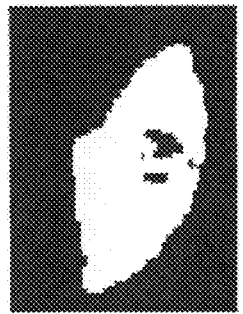
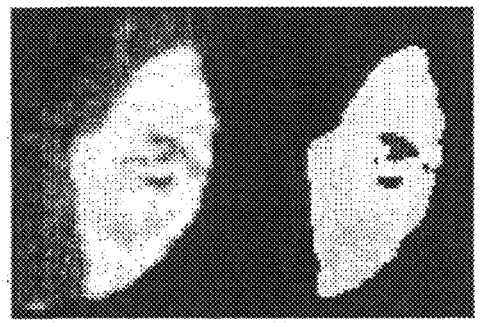
FIG. 13A
FIG. 13B
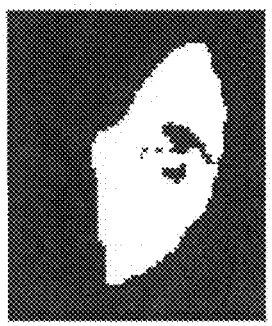
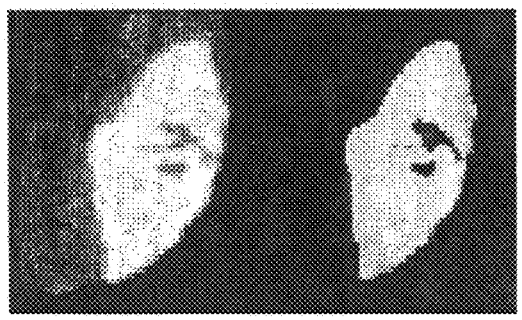
FIG. 14A
FIG. 14B

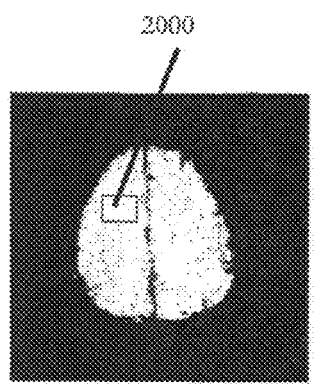 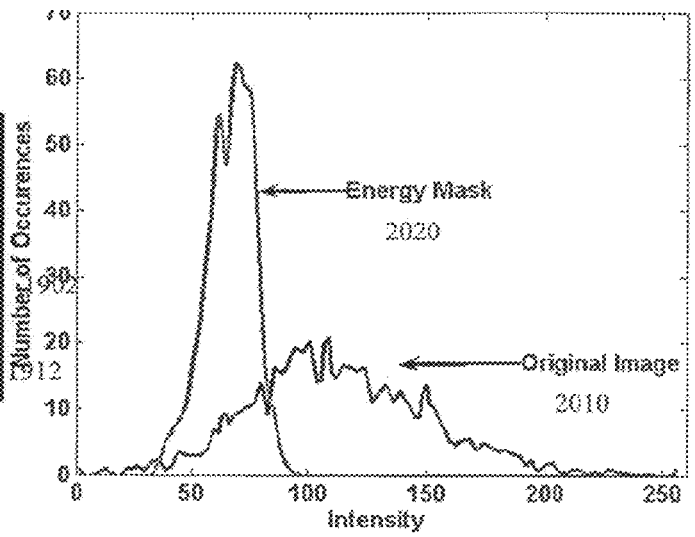
FIG. 20A        FIG. 20B
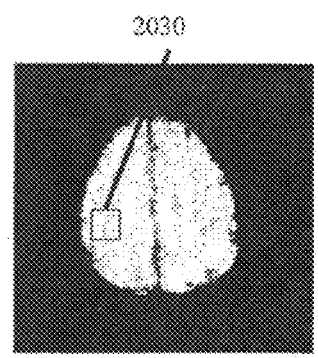 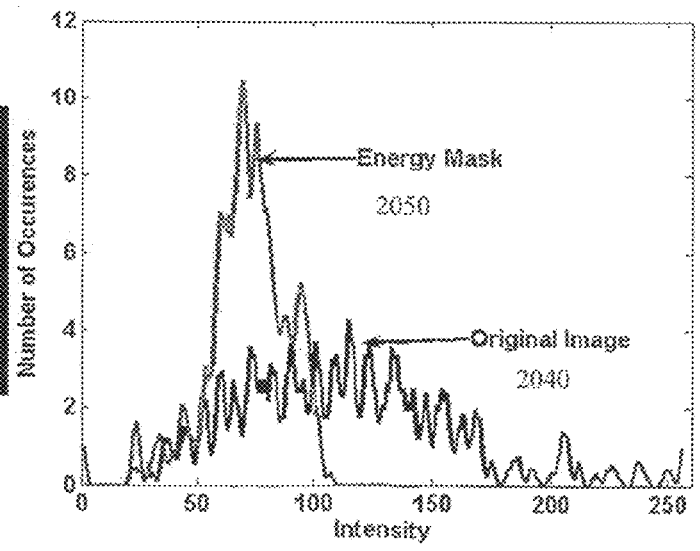
FIG. 20C        FIG. 20D

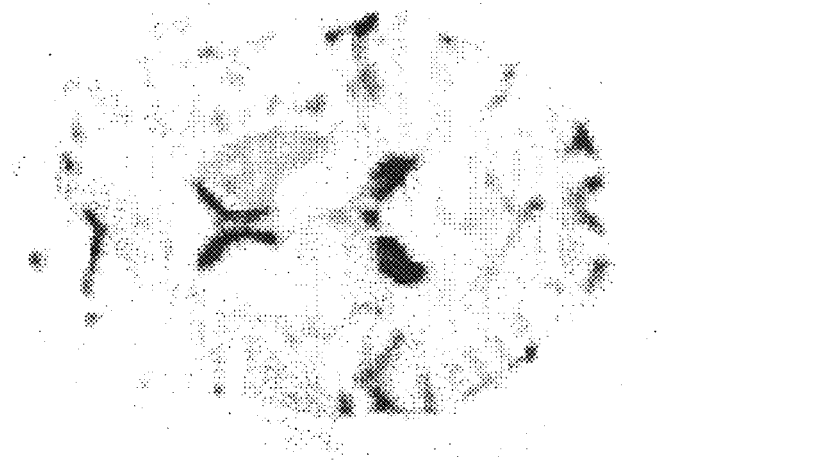
FIG. 23
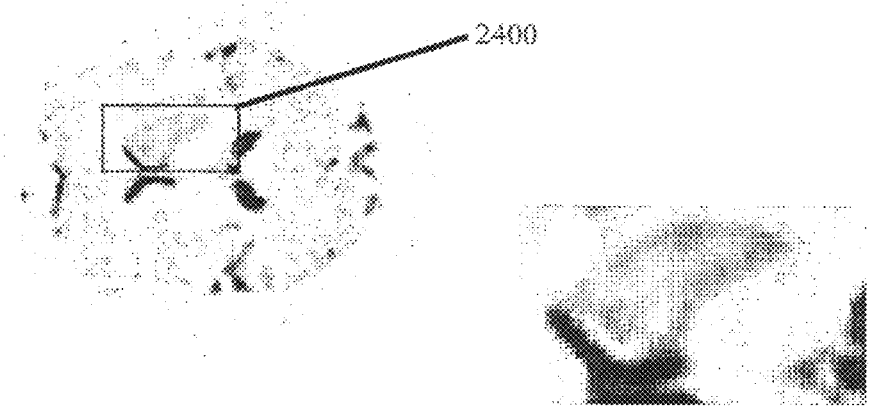
FIG. 24A
FIG. 24B

SEGMENTING INFARCT IN DIFFUSION-WEIGHTED IMAGING VOLUME

TECHNICAL FIELD

The present invention relates generally to magnetic resonance imaging (MRI) sequences, and more particularly to diffusion-weighted imaging (DWI).

BACKGROUND

Cerebral stroke is a major cause of mortality and morbidity in many countries. Prompt assessment and treatment of stroke helps patients affected by this disease to recover some neurological function that may have been lost during the acute phase. Besides classical magnetic resonance imaging (MRI) sequences, two other modalities have been used to evaluate acute stroke patients, namely perfusion imaging (PI) and diffusion-weighted imaging (DWI).

Perfusion imaging (PI) involves hemo-dynamically weighted MR sequences that are based on the passage of magnetic resonance (MR) contrast through brain tissue. Measurements of brain perfusion include vascular transit time, cerebral blood volume, and cerebral blood flow. Serial analysis of arterial input is observed to determine absolute cerebral blood flow. This typically involves measuring relative blood flow and comparing the two hemispheres of the brain for regional differences.

Diffusion-weighted imaging involves images that reflect microscopic random motion of water molecules. Water molecules are in constant motion, and the rate of diffusion depends on the energy of the molecules, which is temperature dependent. However, diffusion is not really random, because of tissue structure. Cell membranes and vascular structures, for example, limit diffusion. In the study of acute strokes, DWI abnormalities are markers of critical ischemia, which typically evolve into infarction.

To obtain diffusion-weighted images, a pair of strong gradient pulses is added to a pulse sequence. The first pulse de-phases the spins, and the second pulse re-phases the spins if no net movement occurs. If net movement of spins occurs between the gradient pulses, signal attenuation occurs. The degree of attenuation depends on the magnitude of molecular translation and diffusion weighting. The amount of diffusion weighting is determined by the strength of the diffusion gradients, the duration of the gradients, and the time between the gradient pulses.

Automatic or semiautomatic tools for segmentation and evaluation of acute stroke regions have been suggested. Fast and accurate segmentation of acute infarct is crucial for evaluation and treatment of stroke patients.

Martel A L, Allder S J, Delay G S, Morgan P S and Moody A R, "Measurement of infarct volume in stroke patients using adaptive segmentation of diffusion weighted MR images," MICCAI, 1679, 22-31, 1999, describes a semi-automatic method to determine infarct volume by diffusion tensor-MRI. The method uses an adaptive threshold algorithm, which incorporates a spatial constraint, to segment images.

Wu Li, Jie Tan, Enzhong Li and Jianping Dai "Robust unsupervised segmentation of infarct lesion from diffusion tensor MR images using multiscale statistical classification and partial volume voxel reclassification," Neuroimage, 23, 1507-1518, 2004, have proposed an unsupervised segmentation method using multiscale statistical classification and partial volume voxel reclassification in the case of diffusion tensor MR images. They attempt to identify the infarct regions and overcome the problem of intensity overlapping caused by diffusion anisotropy, and reclassify partial volume voxels. The method is said to be robust to noise and RF inhomogeneities. This method uses DTI volumes to segment and eliminate the artifacts. The computational complexity is high.

In clinical practice, the analysis of DWI-PI datasets is based on manual image editing and segmentation techniques provided by available commercial medical software. A complete study takes from 15 to 20 minutes of user interaction; see Bardera A, Boada I, Feixas M, Pedraza S, and Rodriguez J, "A Framework to Assist Acute Stroke Diagnosis," Vision, Modeling, and Visualization (VMV 2005)—Article No. 666, Erlangen, Germany, Nov. 16-18, 2005.

Thus, a need clearly exists for a segmentation algorithm that is both less computationally expensive and faster (capable of completing in less than a minute).

SUMMARY

In accordance with an aspect of the invention, there is provided a method of segmenting an infarct in a diffusion-weighted imaging (DWI) volume. The DWI volume comprises slices, each slice comprising pixels forming an original image. The method comprises the steps of: selecting a Region of Interest (ROI) in at least one slice of the DWI volume containing an infarct in the original image, the ROI comprising at least a portion of the slice; selecting a threshold for a minimum size of an infarct region, the threshold specifying a minimum number of pixels; convolving an energy mask with the selected slice, and normalizing the resulting energy image to occupy a predefined gray scale; selecting the ROI in the convolved energy image; determining a threshold for eliminating the background; determining an initial threshold using a histogram of the ROI of the slice without a background region, and performing an initial segmentation of the slice using the initial threshold; labeling individual components of the initial segmentation of the slice; and determining a final threshold using histograms of labeled components of the initial segmentation, and performing a final segmentation of the slice using the final threshold.

In accordance with another aspect of the invention, there is provided an apparatus for segmenting an infarct in a diffusion-weighted imaging (DWI) volume. The DWI volume comprises slices, each slice comprising pixels forming an original image. The apparatus comprises: a module for selecting a Region of Interest (ROI) in at least one slice of the DWI volume containing an infarct in the original image, the ROI comprising at least a portion of the slice; a module for selecting a threshold for a minimum size of an infarct region, the threshold specifying a minimum number of pixels; a module for convolving an energy mask with the selected slice, and normalizing the resulting energy image to occupy a predefined gray scale; a module for selecting the ROI in the convolved energy image; a module for eliminating the background; a module for determining a threshold for eliminating the background; a module for determining an initial threshold using a histogram of the ROI of the slice without a background region, and performing an initial segmentation of the slice using the initial threshold; a module for labeling individual components of the initial segmentation of the slice; and a module for determining a final threshold using histograms of labeled components of the initial segmentation, and performing a final segmentation of the slice using the final threshold.

In accordance with yet another aspect of the invention, there is provided a computer program product comprising a computer readable medium having recorded therein a computer program for segmenting an infarct in a diffusion-weighted imaging (DWI) volume. The DWI volume comprises slices, each slice comprising pixels forming an original image. The computer program product comprises: a computer program code module for selecting a Region of Interest (ROI) in at least one slice of the DWI volume containing an infarct in the original image, the ROI comprising at least a portion of the slice; a computer program code module for selecting a threshold for a minimum size of an infarct region, the threshold specifying a minimum number of pixels; a computer program code module for convolving an energy mask with the selected slice, and normalizing the resulting energy image to occupy a predefined gray scale; a computer program code module for selecting the ROI in the convolved energy image; a computer program code module for determining a threshold for eliminating the background; a computer program code module for determining an initial threshold using a histogram of the ROI of the slice without a background region, and performing an initial segmentation of the slice using the initial threshold; a computer program code module for labeling individual components of the initial segmentation of the slice; and a computer program code module for determining a final threshold using histograms of labeled components of the initial segmentation, and performing a final segmentation of the slice using the final threshold.

BRIEF DESCRIPTION OF THE DRAWINGS

Embodiments of the invention are described hereinafter with reference to the drawings, in which:

FIGS. 4A and 4B are digital images of the entire slice with the ROI selected and the ROI itself for $L5L5^T$ energy mask, respectively;

FIGS. 4C and 4D are digital images of the entire slice with the ROI selected and the ROI itself for $Mod\_S5E5^T$ energy mask, respectively;

FIGS. 13A and 13B are digital images illustrating the results of the final segmented image for the $L5L5^T$ energy mask;

FIGS. 14A and 14B are digital images illustrating the results of the final segmented image for the $Mod\_S5E5^T$ energy mask;

FIGS. 20A and 20B contain a digital image and a histogram of a normal region in a slice, respectively;

FIGS. 20C and 20D contain a digital image and a histogram of a stroke+normal tissue area in a slice;

FIG. 23 is an energy image of the slice shown in FIG. 21;

FIGS. 24A and 24B illustrate a ROI in the energy image convolved with the $Mod\_S5E5^T$ energy mask and normalized to have full gray scale, and a blown up image of the ROI;

DETAILED DESCRIPTION

Figure 1:
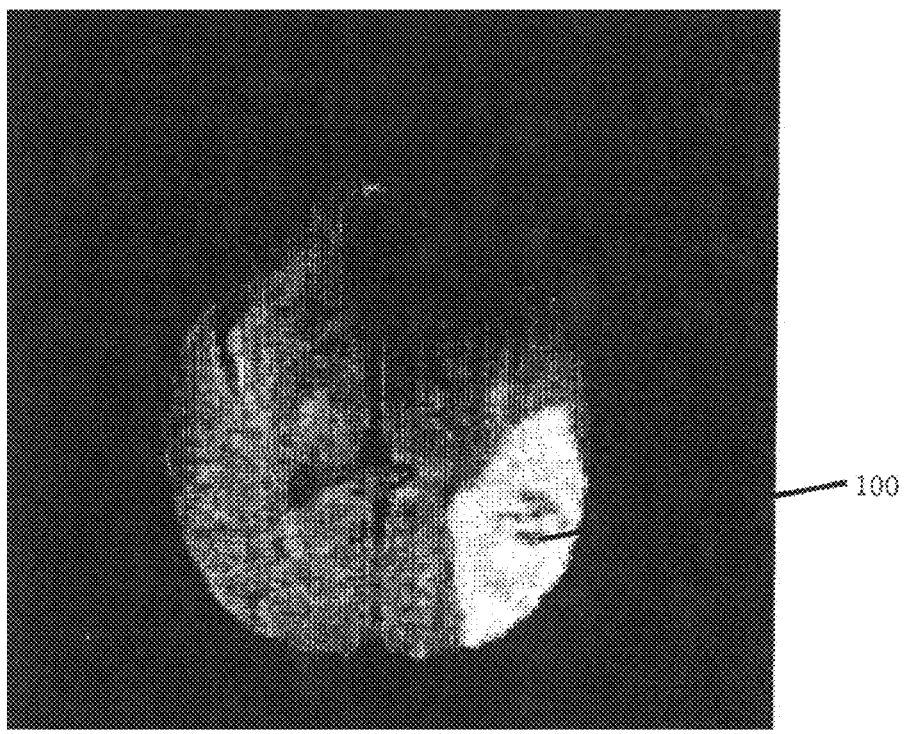
FIG. 1 is an original digital image of a DWI slice of an individual's brain, in which a given volume can be browsed to select slices containing an infarct.

Methods, apparatuses and computer program products for segmenting an infarct in a diffusion-weighted imaging (DWI) volume are disclosed. In the following description, numerous specific details are set forth, including grayscale levels, particular thresholds, cutoff points, and the like. However, from this disclosure, it will be apparent to those skilled in the art that modifications and/or substitutions may be made without departing from the scope and spirit of the invention. In other circumstances, specific details may be omitted so as not to obscure the invention.

The methods may be implemented in modules. A module, and in particular its functionality, can be implemented in either hardware or software. In the software sense, a module is a process, program, or portion thereof that usually performs a particular function or related functions. Such software may be implemented in C, C++, JAVA, JAVA BEANS, or a combination thereof, for example, but may be implemented in any of a number of other programming languages/systems, or combinations thereof. In the hardware sense, a module is a functional hardware unit designed for use with other components or modules. For example, a module may be implemented using discrete electronic components, or it may form at least a portion of an entire electronic circuit such as a Field Programmable Gate Arrays (FPGA), Application Specific Integrated Circuit (ASIC), and the like. A physical implementation may also comprise configuration data for a FPGA, or a layout for an ASIC, for example. Still further, the description of a physical implementation may be in EDIF netlisting language, structural VHDL, structural Verilog, or the like. Numerous other possibilities exist. Those skilled in the art will appreciate that the system may also be implemented as a combination of hardware and software modules.

Some portions of the following description are presented in terms of algorithms and representations of operations on data within a computer system or other device capable of performing computations. Such algorithmic descriptions and representations may be used by those skilled in the art to convey the substance of their work to others skilled in the art. An algorithm is a self-consistent sequence of steps leading to a desired result. The steps are those requiring physical manipulations of physical quantities. Usually, though not necessarily, these quantities take the form of electrical, magnetic, or electromagnetic signals capable of being stored, transferred, combined, compared, and otherwise manipulated. These signals may be referred to as bits, values, elements, symbols, characters, terms, numbers, or the like.

The above and similar terms are to be associated with the appropriate physical quantities and are merely convenient labels applied to such quantities. Unless specifically stated otherwise, and as apparent from the following, discussions utilizing terms such as "reading", "selecting", "storing", "comparing", "analyzing", "generating", "drawing", "using", "determining", "convolving", "selecting", "setting", "removing", "labeling" or the like, refer to the action and processes of a computer system, or a similar electronic device. Such a system or device manipulates and transforms data represented as physical quantities within the registers and memories of the computer system into other data similarly represented as physical quantities within the computer system registers, memories, or another form of storage, transmission or display devices.

Apparatuses and systems for performing the operations of the methods are also described. Such an apparatus may be specifically constructed for the required purpose. Alternatively, the apparatus may comprise a general-purpose computer (e.g., a notebook PC) or another computing device (e.g., a PDA), which may be selectively activated or reconfigured by a computer program read by the computer. The algorithms presented herein are not inherently related to any particular computer or other apparatus; various general-purpose computing machines may be used with programs.

The embodiments of the invention also relate to a computer program(s) or software, in which method steps may be put into effect by computer code. The computer program is not intended to be limited to any particular programming language, operating environment, and implementation thereof. A variety of programming languages, operating systems, and coding thereof may be used. Moreover, the computer program is not intended to be limited to any particular control flow. There are many other variants of the computer program, which can use different control flows without departing the scope and spirit of the invention. Furthermore, one or more of the steps of the computer program may be performed in parallel rather than sequentially.

The computer program may be stored on any computer readable medium. The computer readable medium may comprise storage devices, such as magnetic media disks, CD-ROMs, DVDs, flash RAM devices, memory chips, memory cards, magnetic tape, other storage devices and media suitable for interfacing with and being read by a general-purpose computer, and combinations thereof The computer readable medium may also include a hard-wired medium, such as a local area network or the Internet, or wireless medium, such as an IEEE 802.11 wireless network, BlueTooth, GPRS, a GSM mobile telephone system, PCS, and GPS. The computer program when loaded and executed on such a general-purpose computer effectively results in an apparatus that implements the method steps of the embodiments.

The methods of the embodiments comprise particular control flows. However, different control flows can be practiced without departing from the scope and spirit of the invention.

I. Introduction

Segmentation is an important step in many medical image analyses. In many classification processes, segmentation forms the first step. The applications of segmentation include diagnosis, quantitative evaluation, and treatment of disease. Since manual segmentation is tedious, time consuming and subjective, automatic classification and quantification of healthy and diseased tissues and organs from images obtained by various medical imaging modalities is desirable.

Segmentation of medical images is a challenging task because of the complexity of the images and the absence of models of anatomy that fully capture the possible deformations in each structure. Also, due to the relatively low signal-to-noise ratios and inherent artifacts generally present in medical images, their segmentation is particularly difficult. Because of these problems, even though many algorithms have been reported, most of them have inconsistent results and/or limited applications. Thus, only a few computer-aided detection (CAD) algorithms are being used in clinical practice.

The embodiments of the invention provide a method to localize and segment acute brain infarcts. The method aids clinicians by reducing the time needed to localize and segment the infarcts. A simple and effective automated tool is provided for fast segmentation of acute infarcts and determine infarcted region volumes in DWI datasets. In addition to possible use in the acute phase of stroke evaluation and treatment, such an automated tool is also useful in retrospective studies, where large amounts of imaging data need to be processed. Accurate identification of infarcted regions of the brain is very critical in management of stroke patients. The embodiments of the invention provide an efficient and fast method for identification and segmentation of infarcts in the diffusion-weighted images (DWI).

In specific implementations described hereinafter, DWI scans were acquired with a slice thickness of 5 mm, but other slice thicknesses may be practiced without departing from the scope and spirit of the invention. The slice thickness depends on what a doctor wants to see in the scans. In one implementation, the DWI scans had in-plane resolutions of 1 mm×1 mm, or 1.5 mm×1.5 mm. The number of slices in the DWI scans ranged from 27 to 33. The number of slices depends on slice thickness and the region the clinician wants to have in the scan. Even the in-plane resolution can vary depending on the scan. The algorithm employed in the embodiments of the invention is not affected by these parameters.

Energy measures for the segmentation of the infarcts have been used. Statistical analysis, like identification of distribution, first-order statistics calculation, and Receiver Operating Characteristic (ROC) curve analysis were performed. The accuracy of localization is very high, in some circumstances reaching nearly 100%. In a specific implementation, the algorithm takes about one minute in the Matlab® computing environment to process a volume. However, in another implementation, the speed of localization and segmentation can be enhanced further by implementing the algorithm in VC++.

In the embodiments of the invention, the segmentation algorithm is based on characteristics of histograms of energy masked images. The segmentation algorithm is less computationally expensive and faster (less than a minute).

II. Segmentation Algorithm

Figure 29A:
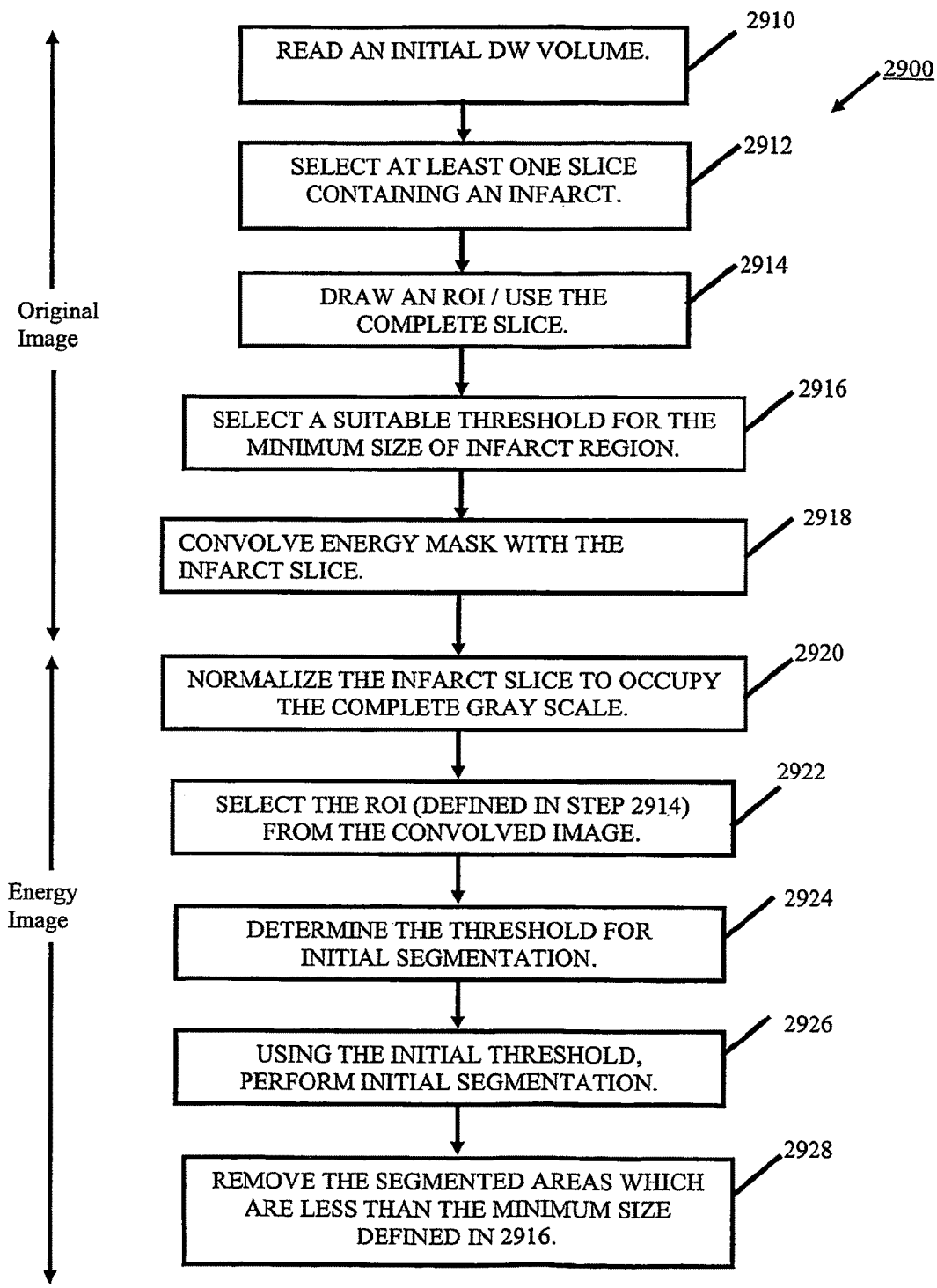
FIG. 29 is a flow diagram illustrating a method segmenting infarcts in DWI volumes.
Figure 29B:
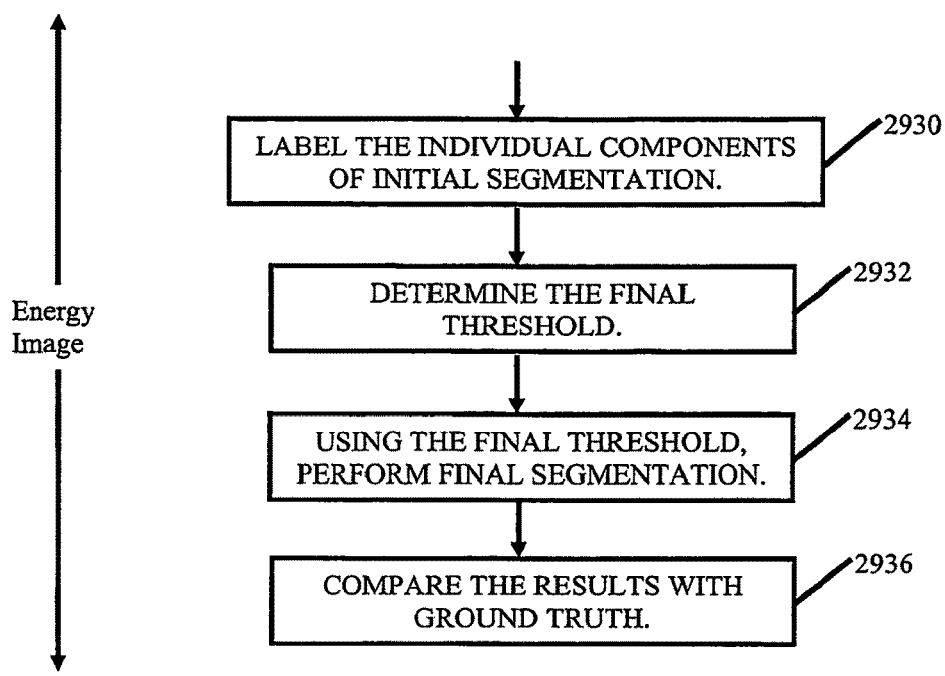

FIGS. 29A and 29B are a flow diagram illustrating a method 2900 of segmenting infarcts in DWI volumes. FIG. 29A contains steps 2910 to 2928, and FIG. 29B contains steps 2930 of the method 2900. Referring to FIG. 29A, processing commences in step 2910. In step 2910, an initial DWI volume is read. Using the information of the DWI dataset (i.e. size, voxel size, number of gray scales), the volume data is read into the computing system, which may be for example a general-purpose personal computer or notebook computer, or a PDA. In step 2912, one or more slices containing an infarct are selected from the original volume. FIG. 1 is an original DWI image of an infarct slice that has been selected. In this slice, an infarcted region 100 is shown with a lighter shade of gray (having higher intensity value) in the lower right portion of the DWI slice.

Figures 2A, 2B:
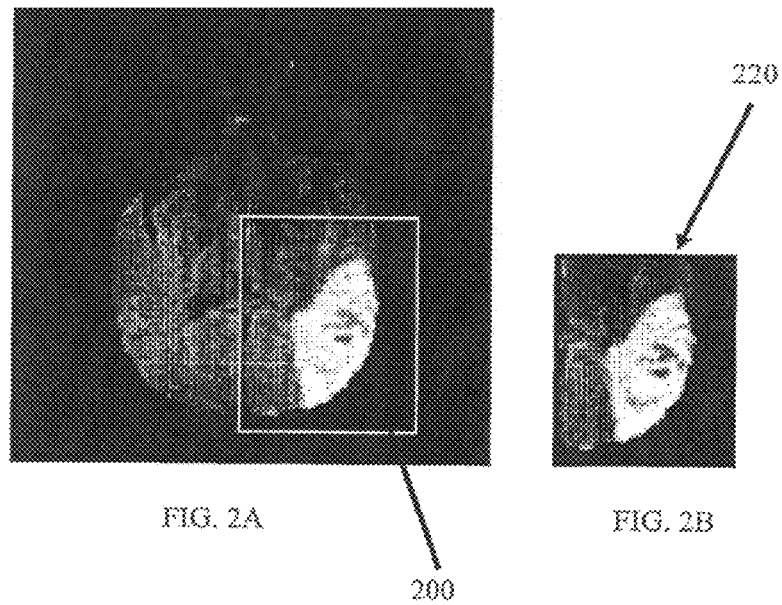
FIG. 2A is the digital image of FIG. 1 in which a Region of Interest (ROI) is selected in the DWI slice.
FIG. 2B is a digital image of FIG. 2A of the selected ROI, which may be further segmented.

In step 2914, a Region of Interest (ROI) is selected in a complete slice. Either the whole slice can be used, or a suitable ROI can be selected for further segmentation. The ROI can be kept constant across all the infarct slices, or the ROI can be varied based on the position and the size of infarcts. The ROI can be varied from slice to slice, or a ROI may not be selected. In such a case, the entire slice is the ROI. For example, a graphical interface tool can be used to permit a user to draw a perimeter around the ROI. FIG. 2A shows the slice of FIG. 1, but has a ROI (indicated by a box 200 with a white perimeter) drawn around the infarct 100 of FIG. 1. FIG. 2B shows the ROI of FIG. 2A depicted as a separate image 220.

In step 2916, a suitable threshold is selected for the minimum size of an infarct region. The infarcts may be of different sizes. If the minimum size threshold is set to zero (0), whatever segmented regions are there in the initial segmentation are retained. If a threshold is defined, any segmented region below the threshold is eliminated. This threshold helps in eliminating some of the noise regions that are generally small in size. Moreover, the minimum-size threshold helps the clinician to eliminate what is unnecessary for him. For example, if the clinician is looking at infarcts that have a size of at least 100 pixels, the clinician can set the threshold to 100, eliminate all the regions below 100, and look at the remaining regions. Therefore, the threshold may be user defined. In one implementation, an infarct region was assumed to contain at least 20 pixels of the DWI slice as the minimum-size threshold.

In step 2918, an energy mask is convolved with the infarct slice. Table 1 lists the details of the two energy masks for segmentation. In the embodiments of the invention, a modified Laws' energy mask $Mod\_S5E5^T$ can be used for convolution with the original stroke image.

TABLE 1

| $L5L5^T =$ | [1 | 4 | 6 | 4 | 1 |
|---|---|---|---|---|---|
|  | 4 | 16 | 24 | 16 | 4 |
|  | 6 | 24 | 36 | 24 | 6 |
|  | 4 | 16 | 24 | 16 | 4 |
|  | 1 | 4 | 6 | 4 | 1] |
| $Mod\_S5E5^T =$ | [1 | −2 | 0 | −2 | −1 |
|  | 0 | 0 | 0 | 0 | 0 |
|  | 2 | −4 | 0 | −4 | −2 |
|  | 0 | 0 | 0 | 0 | 0 |
|  | 1 | −2 | 0 | −2 | −1] |

Laws' energy mask $L5L5^T$ is described in the following publications: Laws, K, *Textured Image Segmentation*, Ph.D. Dissertation, University of Southern California, January 1980; and Laws, K, "Rapid texture identification", In *SPIE Vol. 238 Image Processing for Missile Guidance*, pp. 376-380, 1980.

Figure 3A:
FIGS. 3A and 3B are energy images derived using the $L5L5^T$ and $Mod\_S5E5^T$ energy masks, respectively.
Figure 3B:

In step 2920, the convolved energy image is normalized to occupy the complete (full) gray scale. The convolved image is normalized to have gray scale of 0 to 255 if the image is 8 bit, or to full scale based on the number of bytes used to represent the image. FIGS. 3A and 3B illustrate the convolved, normalized energy images obtained using the $L5L5^T$ and $Mod\_S5E5^T$ energy masks, respectively.

In step 2922, the ROI (defined in step 2914) in the DWI slice containing the infarct is selected from the convolved image. Depending on the nature of the ROI selected, the same region can be used for the convolved energy images for further processing. FIG. 4A illustrates a box 400 to select the ROI in the energy image obtained using the $L5L5^T$ energy mask. FIG. 4B illustrates the ROI 420 of FIG. 4A separately. FIG. 4C illustrates a box 450 to select the ROI in the energy image obtained using the $Mod\_{_S}5E5^T$ energy mask. FIG. 4D illustrates the ROI 470 of FIG. 4C separately.

In step 2924, an initial threshold is determined, and in step 2926 an initial segmentation of the energy image slice is performed using that initial threshold. At this stage, most of the tissue region is removed; there is still no difference of artifacts or the infarct regions. This is referred as an initial segmentation. Using a histogram of the ROI of each slice, the background region (if present) can be eliminated from the ROI in the energy image slice. One energy image slice at a time is used to remove the background of the individual slice for all stroke slices. Only energy image slices are used for background removal.

Figure 5A:
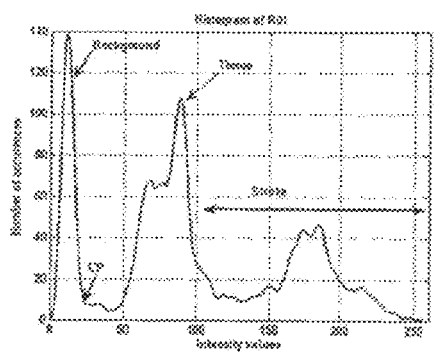
FIGS. 5A and 5B are a histogram illustrating stroke, tissue and background for the histogram of stroke and tissue for $L5L5^T$ energy mask, and a histogram with the background removed for the $L5L5^T$ energy mask and to determine an initial threshold point, respectively.
Figure 5B:
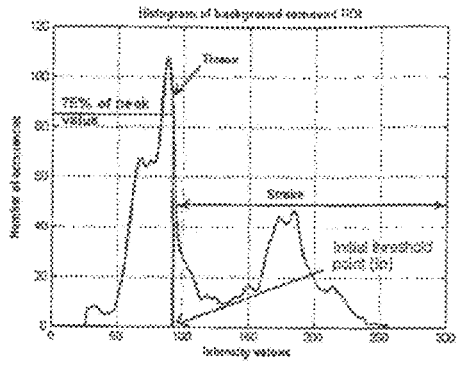

FIG. 5A illustrates a histogram of the ROI for stroke, tissue and background for the $L5L5^T$ energy mask. In the histogram, the number of occurrences of intensity values in the ROI of the energy image slice is plotted as a function of the intensity values. If the original image slice is convolved with the $L5L5^T$ energy mask, the first peak from zero in the energy image slice is found. The background appears dark. In the range of intensity values between L1 (e.g. 0) and L2 (e.g. 50), a large peak is readily identifiable as background. This is followed by a smaller peak between L2 (e.g. 50) and L3 (e.g. 100), which corresponds to normal tissue. Above L3 (e.g. 100), the range for stroke is depicted. Starting at the first peak near zero, the minimum point in the vicinity of that peak is found. This is the cutoff point (CP). The CP is used as the threshold for removing background pixels of the energy image slice. The pixels above the cutoff point (CP) are used, and can be identified as a Background removed volume (BG_Seg_vol). This is shown in FIG. 5B. For each slice of the BG_Seg_vol, the histogram is found, and the first peak position above the intensity value of zero is located. The initial threshold point (Ip) on the histogram is then found, which corresponds to 75% of the peak value, as shown in FIG. 5B. The user can vary this percentage (75%) depending on the segmentation requirements. In FIG. 5B, the Ip is just below L3 (e.g. 100). The intensity values above the Ip are considered stroke values.

Table 2 lists pseudocode for binarizing the energy image slice using the threshold Ip.

TABLE 2

If Init_seg_img (i, j) >= Ip
    Init_seg_img (i, j) = 1
else
    Init_seg_img (i, j) = 0
end Pixels (i, j) of the energy image slice with an intensity value greater than or equal to Ip are assigned a binary value of 1 (stroke range), and those below Ip are assigned a binary value of 0. This intensity Ip is used for initial segmentation in step 2926. All pixels of the energy image slice above or equal to this intensity Ip are considered to find the initial segmented volume (Init_Seg_vol). The pixels can be labeled using an 8-neighborhood and evaluated for their sizes.

Figure 6:
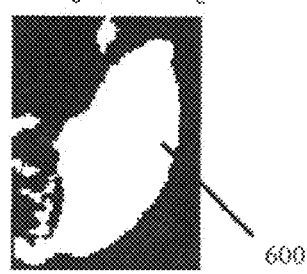
FIG. 6 is a digital image of an initial segmented image for $L5L5^T$ energy mask.

In step 2928, if any region is below the predefined minimum threshold of step 2916, that region is removed from the segmented areas of the binarized energy image slice. FIG. 6 illustrates the initial segmented slice in the ROI 600 for $L5L5^T$ resulting from the binarizing processing.

Figure 7A:
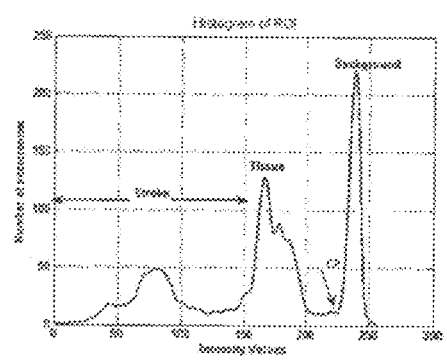
FIGS. 7A and 7B are a histogram illustrating stroke, tissue and background for the histogram of stroke and tissue for the $Mod\_S5E5^T$ energy mask and a histogram with background removed for $Mod\_S5E5^T$ energy mask and to determine an initial threshold point.
Figure 7B:
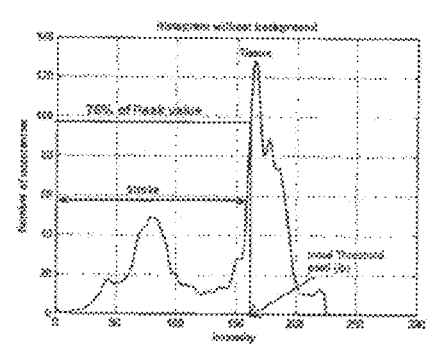

If the Mod_S5E5$^T$ energy mask is used, the first peak from the right is found, since background appears bright in the energy image. FIG. 7A illustrates the histogram of the ROI for stroke, tissue and background in the energy image slice for the Mod_S5E5$^T$ energy mask. Starting at the rightmost peak (between L2 (e.g. 200) and L1 (e.g. 255) in FIG. 7A), the minimum point in the vicinity of the peak is found. This is the cutoff point (CP). The CP is used as a threshold for removing the background pixels. Pixels below the cutoff point (CP) are used and are called the background removed volume (BG_Seg_vol) shown in FIG. 7B. For each slice of the BG_Seg_vol, the histogram is found and the first peak position from the right is located. The initial threshold position (Ip) is found in the histogram, which corresponds to 75% of the peak value of the tissue peak (between L3 (e.g. 150) and L2 (e.g 200)). Again, the user can vary this percentage (75%) depending on the segmentation requirements. Intensity values below the Ip form the stroke range.

Table 3 lists pseudocode for binarizing the energy image using the initial threshold point Ip.

TABLE 3

Figure 8:
FIG. 8 is a digital image of an initial segmented slice in the ROI for the $Mod\_S5E5^T$ energy mask.

If Init_seg_img (i,j) <= Ip
    Init_seg_img (i,j) =1
else
    Init_seg_img (i,j) =0
end Pixels (i, j) of the energy image slice with an intensity value less than or equal to Ip are assigned a binary value of I (stroke range), and those above Ip are assigned a binary value of 0. All pixels below or equal to this intensity Ip are considered to find the initial segmented volume (Init_Seg_vol). FIG. 8 illustrates the initial segmented slice in the ROI 800 for Mod_S5E5$^T$ energy mask resulting from the binarizing processing.

Figure 9A:
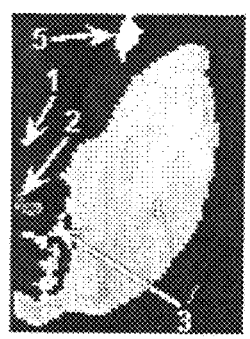
FIGS. 9A and 9B are digital images illustrating the labeling connected regions for the $L5L5^T$ and $Mod\_S5E5^T$ energy masks, respectively.
Figure 9B:
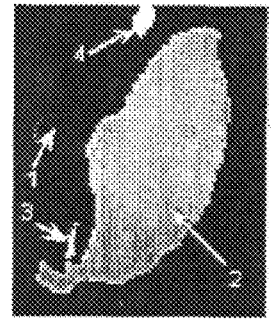
Figure 10A:
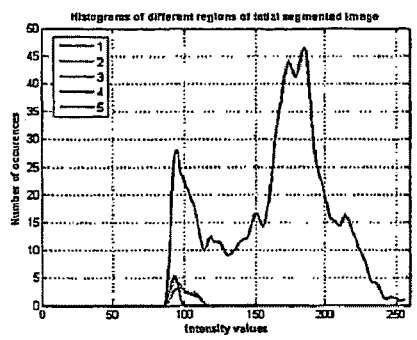
FIGS. 10A and 10B are histograms corresponding to different regions for the $L5L5^T$ and $Mod\_S5E5^T$ energy masks, respectively.
Figure 10B:
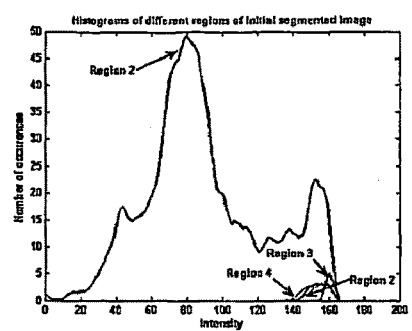

Referring to FIG. 29B, in step 2930, the individual components (i.e. connected regions) of the initial segmentation (Init_Seg_vol) are labeled. For each energy image slice in the Init_Seg_vol 600, 800 (FIGS. 6 and 8), eight-neighborhood labeling is used. The connected regions are labeled 1-5 and 1-4 in FIGS. 9A and 9B for $L5L5^T$ and Mod_S5E5$^T$, respectively, and the non-zero minimum and maximum histogram bins are found for each component. The number of labeled regions is "N". FIGS. 10A and 10B show histograms corresponding to different labeled regions for $L5L5^T$ and Mod_S5E5$^T$, respectively.

Figure 11A:
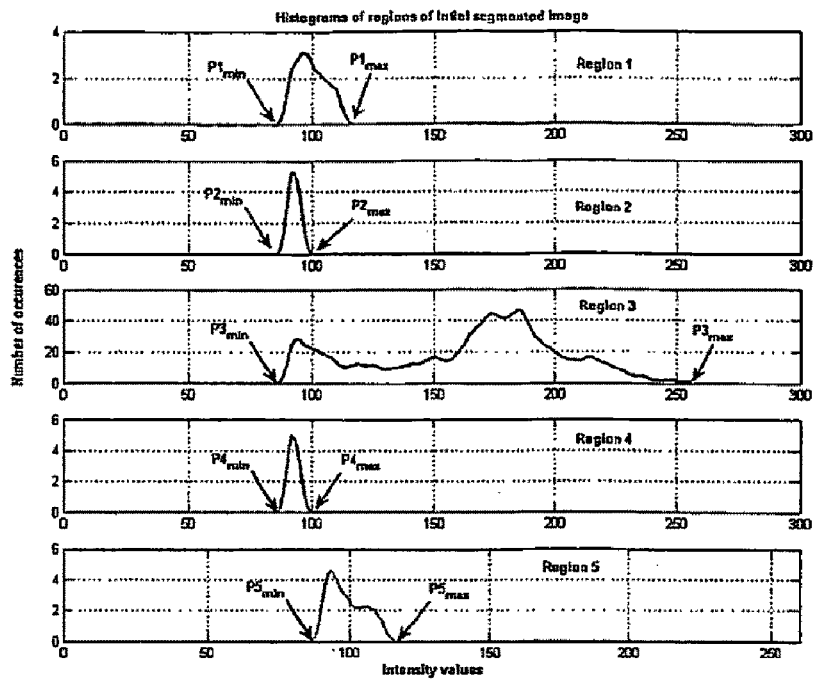
FIGS. 11A and 11B are each five plots showing the determination of minima of individual histograms for the $L5L5^T$ and $Mod\_S5E5^T$ energy masks, respectively.
Figure 11B:
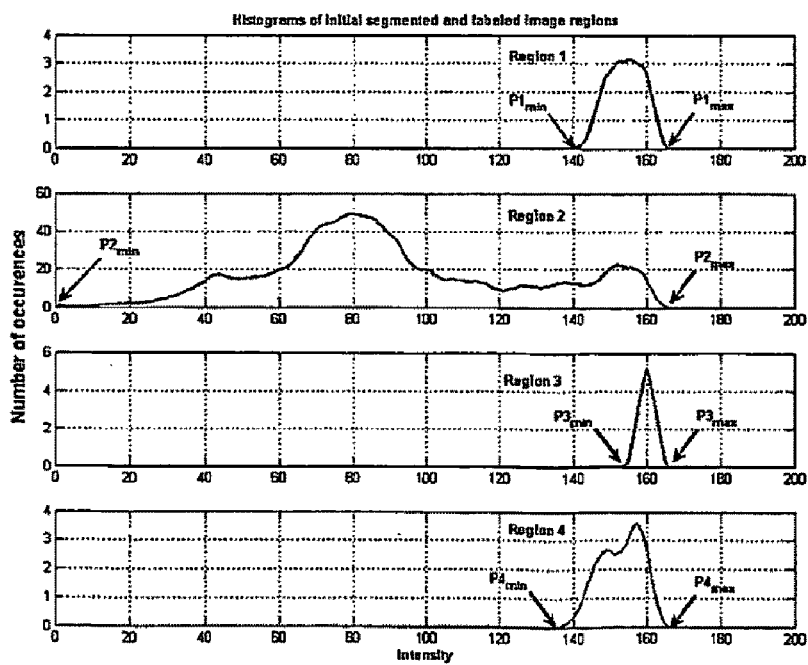

In step 2932, the final threshold is determined, and in step 2934, a final segmentation of the energy image slice is performed using that final threshold. FIG. 11A illustrates five histograms of regions of the initial segmented image (regions 1 to 5 for FIG. 9A), which are used to determine the minima of individual histograms for the $L5L5^T$ energy mask. FIG. 11B illustrates four histograms of regions of the initial segmented image (regions 1 to 4 for FIG. 9B) which are used to determine the minima of individual histograms for the Mod_S5E5$^T$ energy mask. With reference to FIGS. 11A and 11B, the difference of maxima and minima as vector R is found depending on which mask was used as shown in Table 4. Difference of P max in case of $L5L5^T$ (P_min in case of Mod_S5E5$^T$ ) of different histograms are elements of Vector R. Table 4 explains Vector R, where vector means a list containing more than one value.

TABLE 4

| | |
|---|---|
| If $L5L5^T$ is used | R = [($P2_{max} - P1_{max}$) ($P3_{max} - P2_{max}$) ... ($PN_{max} - PN - 1_{max}$)] |
| If Mod_S5E5$^T$ is used | R = [($P2_{min} - P1_{min}$) ($P3_{min} - P2_{min}$) ... ($PN_{min} - PN - 1_{min}$)]; |

The vector R is sorted in descending order. The index point of the vector R is found where the value <=10% of 255 (because the first histogram contains the intensities of the second histogram). Let the index be at M. Table 5 illustrates the calculation of the final threshold ($I_F$).

TABLE 5

| | |
|---|---|
| If $L5L5^T$ is used, | $I_F = T * (PM + 1)_{max}$, where T is the parameter for controlling the type of segmentation. A default value is T = 1, but can be set between [0.6, 1.2]. A value of T less than 1 indicates under segmentation, and above 1 indicates over segmentation. |
| If Mod_S5E5$^T$ is used, | $I_F = T * (PM + 1)_{max}$, where T is the parameter for controlling the type of segmentation. A default value is T = 1, but can be set between [0.6, 1.2]. A value of T less than 1 indicates under segmentation, and above 1 indicates over segmentation. |

Figure 12A:
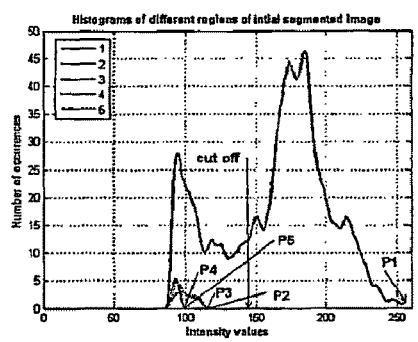
FIGS. 12A and 12B are histograms showing the determination of the cutoff for final segmentation for $L5L5^T$ and $Mod\_S5E5^T$, respectively.
Figure 12B:
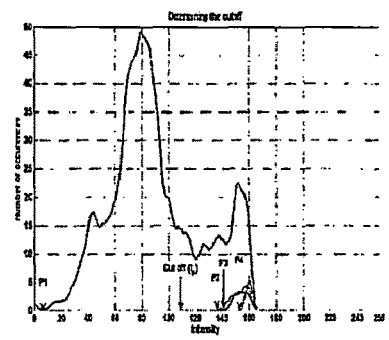

FIGS. 12A and 12B illustrate determination of the final threshold or cutoff ($I_F$) for $L5L5^T$ and Mod_S5E5$^T$, respectively. Pixels above $I_F$ are found for the energy masks $L5L5^T$, and pixels below $I_F$ are found for the energy mask Mod_S5E5$^T$. FIG. 13A shows the final segmented binary image and FIG. 13B shows side-by-side the initial ROI and the final segmented image in gray scale for the $L5L5^T$ energy mask. FIG. 14A shows the final segmented binary image and FIG. 14B shows side-by-side the initial ROI and the final segmented image in gray scale for the Mod_S5E5$^T$ energy mask. The foregoing step yields the final segmentation as shown in FIGS. 13 and 14.

The following features may be found for each region in the final segmented image:
- Mean;
- Variance;
- Skewness;
- Range (width);
- Kurtosis; and
- Fractal dimension.

Figure 15:
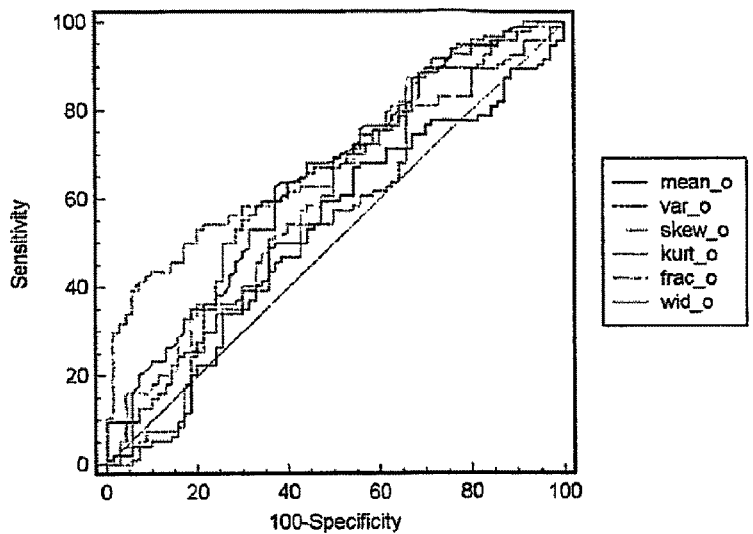
FIG. 15 is a plot of ROC curves for the original image of FIG. 1.

In step 2936, the results are compared with the ground truth. Ground truth is the "manually segmented stroke region given by an expert". Ground truths are the standards against which the algorithmic results are evaluated. Processing terminates after step 2936. ROC curve analysis of artifacts and ground truth is performed for regions=100 pixels. The original image yields area close to 0.5 (See Table 6 and FIG. 15) under the ROC curve for all the parameters described above. Table 6 lists the Area Under the Curve (AUC) with standard error (SE) and confidence bounds for the original image.

TABLE 6

|  | AUC | SE | 95% CI |
| --- | --- | --- | --- |
| Mean_o | 0.524 | 0.046 | 0.445-0.603 |
| Variance_o | 0.638 | 0.043 | 0.559-0.711 |
| Skewness_o | 0.614 | 0.045 | 0.535-0.689 |
| Kurtosis_o | 0.548 | 0.046 | 0.468-0.625 |
| Fractal dimension_o | 0.681 | 0.043 | 0.603-0.751 |
| Width_o (Range_o) | 0.640 | 0.043 | 0.562-0.714 |

Figure 16:
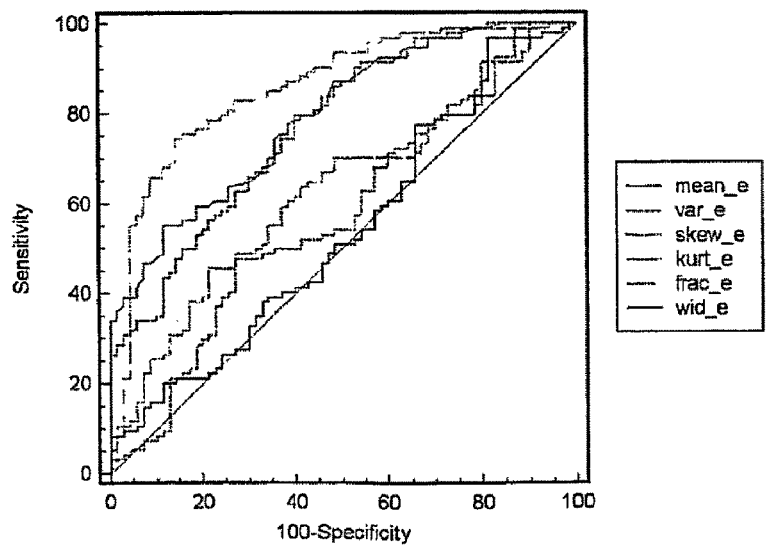
FIG. 16 is a plot of ROC curves for the energy image.

However, the energy image yields increased area under skewness, width (range) and variance. Even the lower confidence bounds are=0.7 (see Table 7 purpose and FIG. 16) for these parameters.

TABLE 7

|  | AUC | SE | 95% CI |
| --- | --- | --- | --- |
| Mean_e | 0.537 | 0.045 | 0.457-0.615 |
| Variance_e | 0.771 | 0.036 | 0.699-833 |
| Skewness_e | 0.856 | 0.029 | 0.792-0.906 |
| Kurtosis_e | 0.576 | 0.045 | 0.497-0.653 |
| Fractal dimension_e | 0.623 | 0.045 | 0.544-0.697 |
| Width_e (Range_e) | 0.793 | 0.034 | 0.723-0.852 |

Figure 17A:
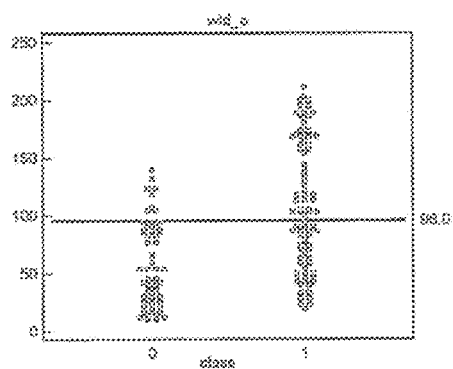
FIGS. 17A and 17B are dot diagrams for range, i.e. width and variance, where the index 0 stands for artifacts class and 1 stands for Ground Truth class.
Figure 17B:
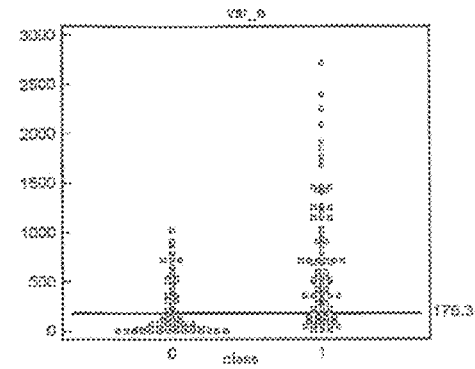

The dot diagrams in FIGS. 17A and 17B show that most of the artifacts (represented by zeroes) tend to have smaller range(width) and variance of intensities although stroke regions tend to have a distributed nature (in other words, stroke most probably has a larger range). Skewness lies between −0.5 to +0.5 for most of the regions (artifact+stroke) implying that those regions do not deviate much from normality. Consequently, one may not be able to interpret much from this parameter.

Figure 18:
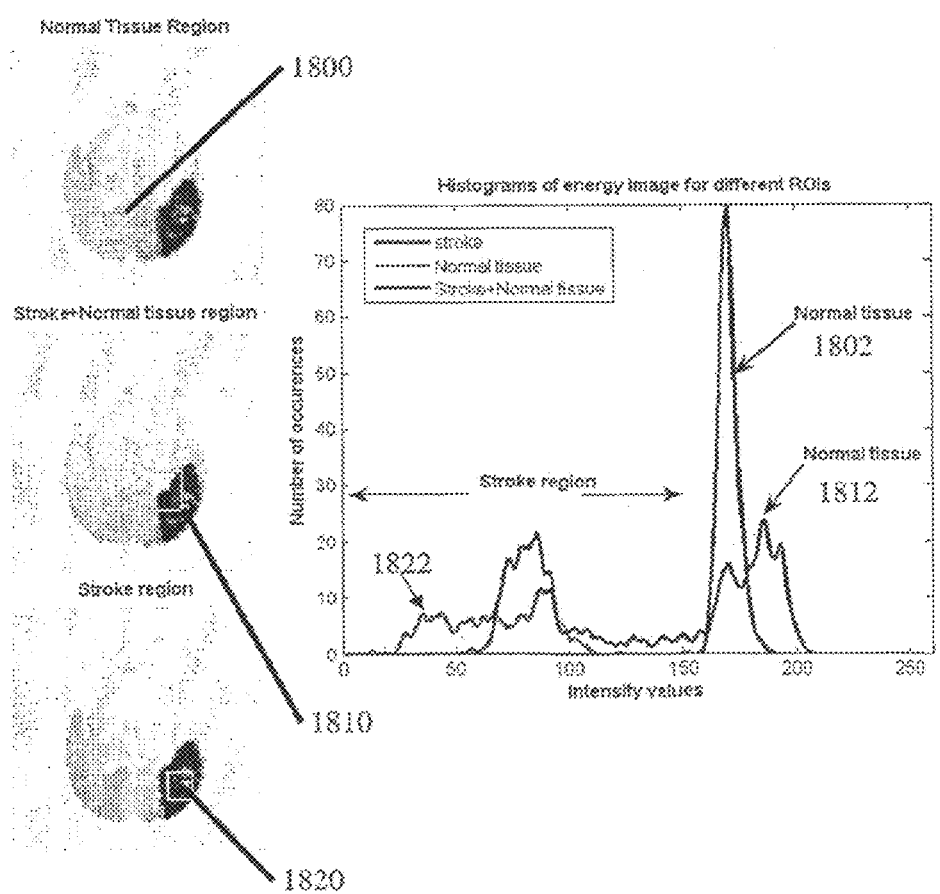
FIG. 18 contains digital images of different ROIs containing a normal tissue region, a stroke and normal tissue region, and a stroke region, and a histogram of energy image for the different ROIs corresponding to the normal tissue region, the stroke and normal tissue region, and the stroke region.
Figure 19:
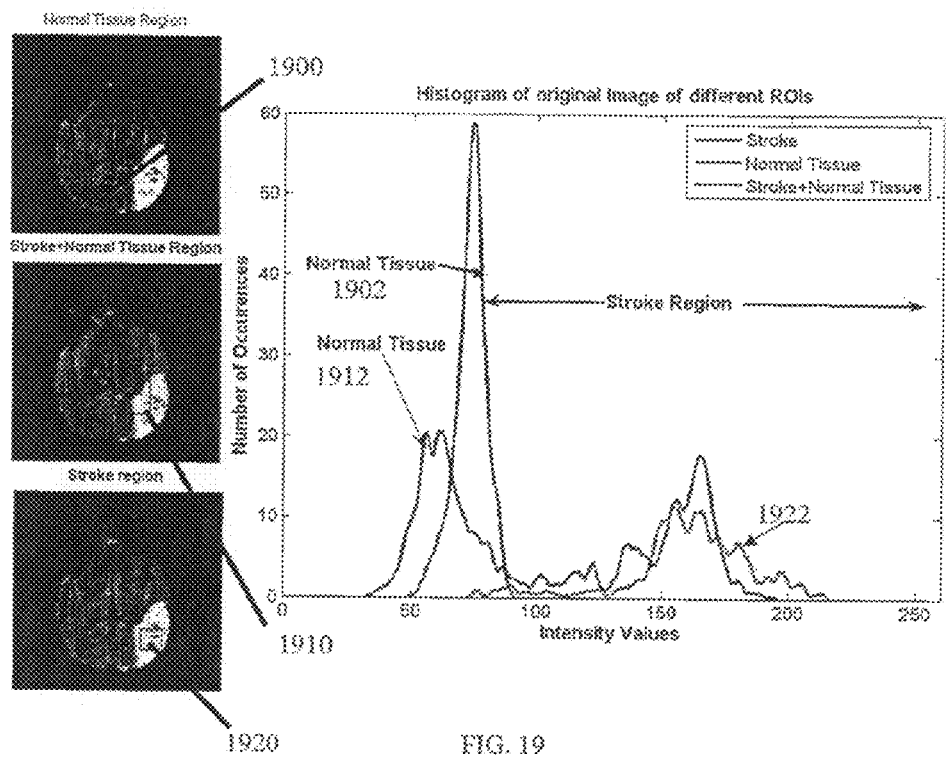
FIG. 19 contains digital images of different ROIs containing a normal tissue region, a stroke and normal tissue region, and a stroke region, and a histogram of the original image for the different ROIs corresponding to the normal tissue region, the stroke and normal tissue region, and the stroke region in the original image.

FIGS. 18 and 19 illustrate different ROIs of a DWI slice under analysis and the corresponding histogram for those different ROIs for the energy image and the original image, respectively. Histograms 1802, 1902 for ROIs 1800, 1900 corresponding to normal tissues are more symmetric, narrow and smooth in nature. The stroke regions 1822, 1922 for ROIs 1820, 1920 tend to show a more complex curve and have a wider range. The histogram 1812, 1912 for ROIs 1810, 1910 are also shown. From the ROI histogram, a determination can be made whether the ROI contains an infarct region, normal region etc. Since the nature of the peaks and shape of the curves for each region are distinct, this information can be derived using the histogram. In the histogram of a ROI, the stroke peak and normal tissue peak are more distinct in the energy images as compared to original images.

FIG. 20A shows a normal region in a ROI 2000 in a slice, and FIG. 20B shows the corresponding histogram with curves for the energy mask 2020 and original image 2010. FIG. 20C shows a stroke and normal tissue region in a ROI 2030, and FIG. 20D shows the corresponding histogram with curves for the energy mask 2020 and original image 2010.

III. Diffusion Weighted T2 Image

Figure 21:
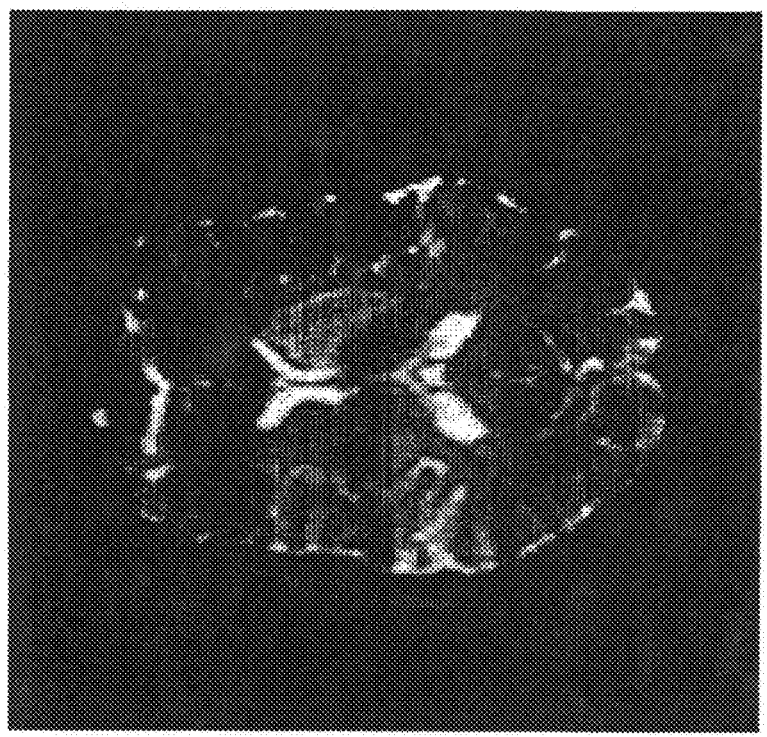
FIG. 21 is an original diffusion weighted T2 image, in which a given volume can be browsed to select infarct slices.
Figure 22A:
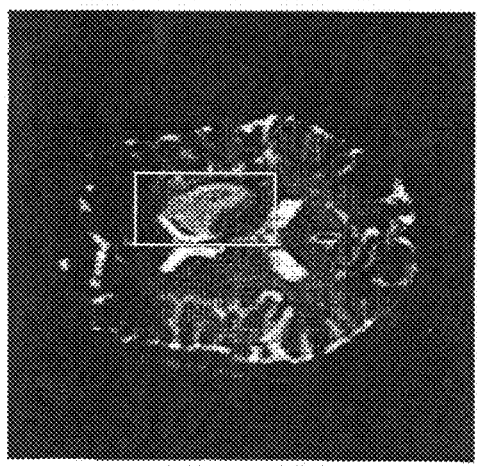
FIG. 22A is the digital image of FIG. 21 in which a ROI of the original image is selected.
Figure 22B:
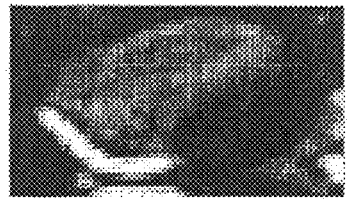
FIG. 22B is a digital image of FIG. 22A of the selected ROI, which may be further segmented.

For an introduction, please refer to T. Moritani, S. Ekholm, P.-L. Westesson, Diffusion weighted MR imaging of the brain, Spinger. ISBN: 3540253599. The method 2900 of FIG. 29 can be used to segment a diffusion weighted T2 image. FIG. 21 shows a slice from diffusion weighted T2 image. FIG. 22A shows a ROI (indicated by white box) and FIG. 22B shows the ROI as a separate enlarged image. FIG. 23 shows an energy image obtained by convolving the original T2 image with the Mod_S5E5T energy mask and normalized to have full gray scale. FIG. 24A shows the ROI 2400 in the energy image of FIG. 23, and FIG. 24B shows the ROI as a separate enlarged image.

The background region is removed from the ROI by first determining the cut off point (CP) and retaining from the ROI only those regions which have values less than CP.

Figure 25A:
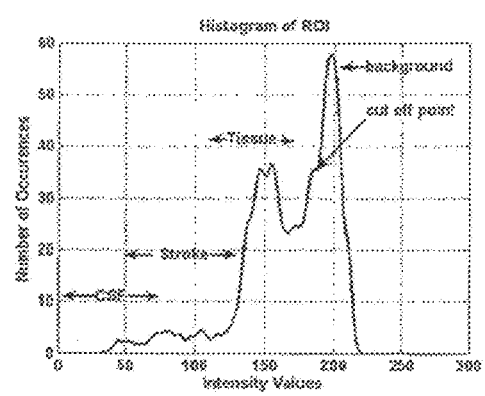
FIGS. 25A and 25B are histograms of the ROI with and without background, respectively, in which the background is removed and the initial segmentation cutoff is determined.
Figure 25B:
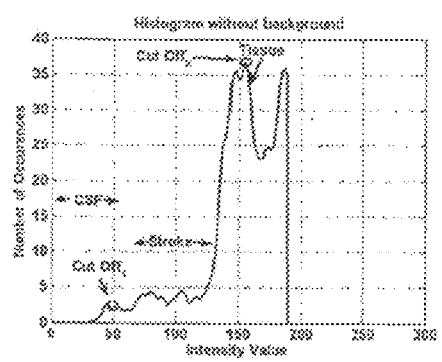

FIGS. 25A and 25B show a histogram of the ROI with and without the background, obtained in the manner described hereinbefore. The initial segmentation is determined using the user defined parameter, say p1 in the CSF region (e.g default=50 from experimentation, varies from 40-60, for an 8 bit image). Two thresholds, Cut Off1 and Cut Off2, are used to obtain initial segmentation of the image. The lower threshold, Cut Off1, is obtained by finding the first minima from P1 and higher threshold Cut Off2 is obtained by finding the first maxima from the background cut off point CP (FIG. 25B). Table 8 lists the definition of the initial segmented image.

TABLE 8

| If Energy_image(i, j) >= Cut Off1 & Energy_image(i, j) =< Cut Off2, where i and j represent the row and column of the image, | Initial_segmented_Image (i, j) = 1 |
| --- | --- |
| Otherwise | Initial_segmented_Image (i, j) = 0 |

Figure 28:
FIG. 28 is a digital image of a final segmented image.
Figure 26:
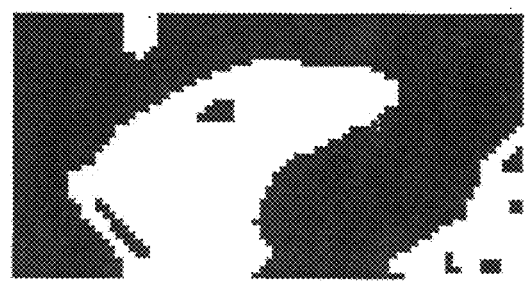
FIG. 26 is a digital image of an initial segmented slice.
Figure 27A:
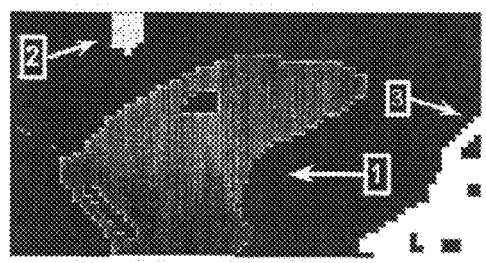
FIGS. 27A and 27B are an image of labeled regions and its histogram.
Figure 27B:
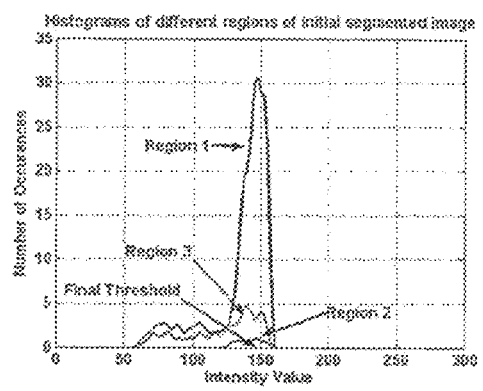

FIG. 26 shows the initial segmented slice following binarizing. FIGS. 27A and 27B are a labeled initial segmented image comprising labeled different regions and the corresponding histograms of the different regions of the initial segmented image. A difference vector R is formed, as described above in Table 4, and the final threshold is found as described in Table 5. In FIG. 27B, curves for regions 1, 2 and 3 are shown along with the calculated final threshold. This step yields final segmented image as shown in FIG. 28.

Since CSF and stroke regions have a region of overlap, the segmentation cannot isolate CSF regions completely. However by adjusting the parameters, the algorithm can do a better job.

In general, the above algorithm can also be used on original images directly (similar to $L5L5^T$) and can be extended for other energy masks. It is not restricted to the two masks described here.

The embodiments of the invention can differentiate a normal tissue curve from the stroke+normal tissue curve in an improved manner, even on a noisy slice. The energy image histograms show a smooth and symmetric nature for normal tissues even in noisy slices (see FIG. 20). This concept can be extended to differentiate between a normal tissue region and a stroke region, since the two peaks corresponding to a normal tissue region and a stroke region are de-correlated in a much better way in the energy image. Artifacts and normal tissues tend to have narrow, symmetric and smoother distribution of intensities compared to strokes having an irregular, complex and wider range distribution of intensities. Thus, based on such properties, the segmentation algorithm can detect stroke regions, normal tissue regions and stroke+normal tissue regions in DWI images.

IV. Computer Hardware

Figure 30:
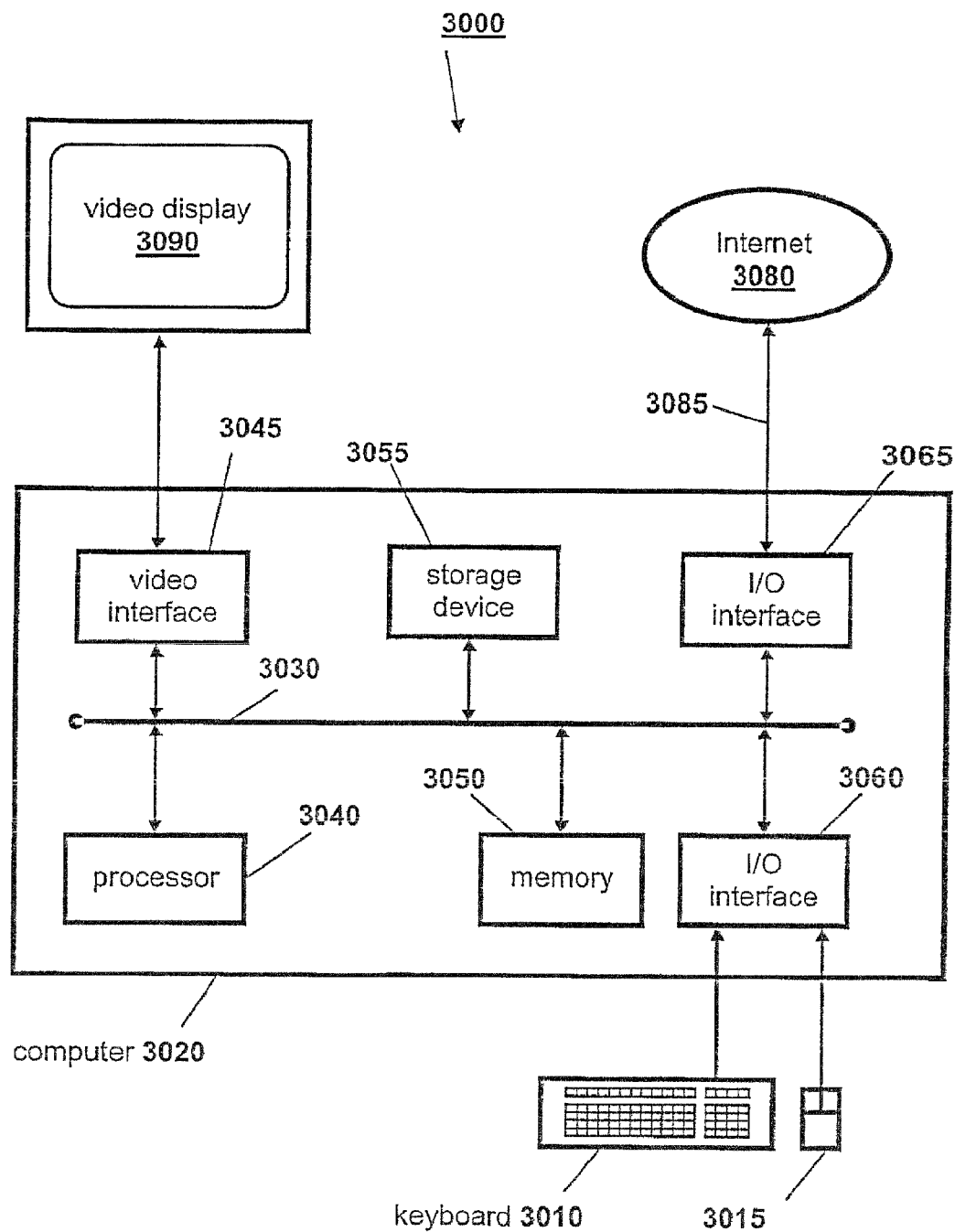
FIG. 30 is a schematic representation of a computer system suitable for performing the methods described hereinafter.

The method of segmenting infarcts in a DWI volume may be implemented as computer software. FIG. 30 is a schematic representation of a computer system 3000 of a type that is suitable for executing computer software for medical image processing as described herein. Computer software executes under a suitable operating system installed on the computer system 3000. The components of the computer system 3000 include a computer 3020, a keyboard 3010 and mouse 3015, and a video display 3090. The computer 3020 includes a processor 3040, a memory 3050, input/output (I/O) interfaces 3060, 3065, a video interface 3045, and a storage device 3055. The processor 3040 is a central processing unit (CPU) that executes the operating system and the computer software executing under the operating system. The memory 3050 includes random access memory (RAM) and read-only memory (ROM).

The video interface 3045 is connected to video display 3090 and provides video signals for display on the video display 3090. User input to operate the computer 3020 is provided from the keyboard 3010 and mouse 3015. The storage device 30 can include a disk drive or any other suitable storage medium. Each of the components of the computer 3020 is connected to an internal bus 3030 that includes data, address, and control buses, to allow components of the computer 3020 to communicate with each other via the bus 3030. The computer system 3000 can be connected to one or more other similar computers via a input/output (I/O) interface 3065 using a communication channel 3085 to a network, such as the Internet 3080. The computer software may be recorded on a portable storage medium, in which case, the computer software program is accessed by the computer system 3000 from the storage device 3055. Alternatively, the computer software can be accessed directly from the Internet 3080 by the computer 3020. In either case, a user can interact with the computer system 3000 using the keyboard 3010 and mouse 3015 to operate the programmed computer software executing on the computer 3020. Other configurations or types of computer systems can be equally well used to execute computer software that assists in implementing the techniques described herein.

A small number of embodiments of the invention regarding methods, apparatuses, and systems for segmenting an infarct in a diffusion-weighted imaging (DWI) volume have been described. In the light of the foregoing, it will be apparent to those skilled in the art in the light of this disclosure that various modifications and/or substitutions may be made without departing from the scope and spirit of the invention.

We claim:

1. A computer-implemented method of segmenting an infarct in a diffusion-weighted imaging (DWI) volume, said DWI volume comprising a plurality of slices, each slice comprising a plurality of pixels forming an original image, said method comprising the steps of:

selecting a Region of Interest (ROI) in at least one selected slice of said DWI volume containing an infarct in said original image, said ROI comprising said whole slice or at least a portion of said slice;

selecting a suitable threshold for a minimum size of an infarct region, said threshold specifying a minimum number of pixels;

convolving an energy mask with said selected slice, and normalizing said resulting energy image to occupy a predefined gray scale;

selecting a ROI in said convoled energy image without a background region;

determining a threshold for eliminating the background;

determining an initial threshold using a histogram of said ROI of said slice without a background region, and performing an initial segmentation of said slice using said initial threshold;

labeling individual components of said initial segmentation of said slice to identify regions present after threshold determination and binarization; and determining a final threshold using histograms of labeled components of said initial segmentation, and performing a final segmentation of said slice using said final threshold.

2. The method according to claim 1, further comprising the steps of:

reading the initial DWI volume into a computing system; and selecting at least one slice comprising an infarct.

3. The method according to claim 2, wherein the dataset of said DWI volume comprises size, voxel size, and number of gray scales.

4. The method according to claim 1, wherein said ROI is kept constant across two or more slices of said DWI volume.

5. The method according to claim 1, further comprising the step of varying said ROI based on at least one of position and size of an infarct in said slice of said DWI volume.

6. The method according to claim 5, wherein a graphical interface tool permits a perimeter to be drawn around the ROI.

7. The method according to claim 1, wherein a modified Laws' energy mask is convolved with said selected slice.

8. The method according to claim 7, wherein said modified Laws' energy mask Mod_S5E5$^T$ is:

$$\begin{bmatrix} 1 & -2 & 0 & -2 & -1 \\ 0 & 0 & 0 & 0 & 0 \\ 2 & -4 & 0 & -4 & -2 \\ 0 & 0 & 0 & 0 & 0 \\ 1 & -2 & 0 & -2 & -1 \end{bmatrix}.$$

9. The method according to claim 1, wherein a Laws' energy mask L5L5$^T$ is convolved with said selected slice.

10. The method according to claim 9, wherein said modified Laws' energy mask is:

$$L5L5^T = \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}.$$

11. The method according to claim 1, wherein said ROI in said convolved energy image is the same as the ROT in the selected slice.

12. The method according to claim 1, wherein said convolved energy image is normalized to have gray scale of 0 to 255.

13. The method according to claim 1, wherein said background is removed from said histogram used to determine said initial threshold.

14. The method according to claim 13, further comprising the step of finding a first peak dependent upon said energy mask convolved with said original image.

15. The method according to claim 14, further comprising the step of finding a minimum point in the vicinity of said peak used as a cutoff point used as a threshold to remove background pixels.

16. The method according to claim 15, further comprising the steps of finding a first peak in said histogram with said background removed and finding said initial threshold point (Ip), which corresponds to a specified percentage of the peak value.

17. The method according to claim 16, wherein said specified percentage is 75%.

18. The method according to claim 16, wherein said specified percentage can be varied depending on segmentation requirements.

19. The method according to claim 16, further comprising the step of binarizing said energy image using said initial threshold point Ip.

20. The method according to claim 1, wherein said step of determining said final threshold comprises the step of finding non-zero minimum and maximum histogram bins for each labeled component.

21. The method according to claim 20, wherein said step of determining said final threshold comprises the step of determining the minima of individual histograms.

22. The method according to claim 21, wherein said step of determining said final threshold comprises the step of finding the difference of maxima and minima as a vector R is found depending on the used energy mask.

23. The method according to claim 22, wherein said vector R is:

If $L5L5^T$ is used, $R=[(P2_{max}-P1_{max})\ (P3_{max}-P2_{max})\ldots(PN_{max}-PN-1_{max})]$ If $Mod\_S5E5^T$ is used, $R=[(P2_{min}-P1_{min})\ (P3_{min}-P2_{min})\ldots(PN_{min}-PN-1_{min})]$.

24. The method according to claim 23, further comprising the step of sorting said vector R in descending order.

25. The method according to claim 24, further comprising the step of finding the index point of said vector R.

26. The method according to claim 25, further comprising the step of calculating said final threshold:

If $L5L5^T$ is used, $I_F=T*(PM+1)_{max}$, where $T$ is a user defined parameter to control segmentation and has a default value, If $Mod\_S5E5^T$ is used, $I_F=T*(PM+1)_{max}$, where $T$ is a user defined parameter to control segmentation and has a default value, where M is the index.

27. The method according to claim 26, further comprising the step of binarizing said energy image using said final threshold point $I_F$.

28. The method according to claim 1, further comprising the step of comparing said final segmentation of said slice with ground truth.

29. An apparatus for segmenting an infarct in a diffusion-weighted imaging (DWI) volume, said DWI volume comprising a plurality of slices, each slice comprising a plurality of pixels forming an original image, said apparatus comprising:

means for selecting a Region of Interest (ROI) in at least one selected slice of said DWI volume containing an infarct in said original image, said ROI comprising said whole slice or at least a portion of said slice;

means for selecting a suitable threshold for a minimum size of an infarct region, said threshold specifying a minimum number of pixels;

means for convolving an energy mask with said selected slice, and normalizing said resulting energy image to occupy a predefined gray scale;

means for selecting said ROI in said convolved energy image without a background region;

means for determining the threshold for eliminating the background;

means for determining an initial threshold using a histogram of said ROI of said slice without a background region, and performing an initial segmentation of said slice using said initial threshold;

means for labeling individual components of said initial segmentation of said slice to identify regions present after threshold determination and binarizatiom; and means for determining a final threshold using histograms of labeled components of said initial segmentation, and performing a final segmentation of said slice using said final threshold.

30. The apparatus according to claim 29, further comprising:

means for reading said DWI volume into a computing system; and means for selecting at least one slice comprising an infarct.

31. The apparatus according to claim 30, wherein the dataset of said DWI volume comprises size, voxel size, and number of gray scales.

32. The apparatus according to claim 29, wherein said ROI is kept constant across two or more slices of said DWI volume.

33. The apparatus according to claim 29, further comprising means for varying said ROI based on at least one of position and size of an infarct in said slice of said DWI volume.

34. The apparatus according to claim 33, wherein said varying means comprises a graphical interface tool that permits a perimeter to be drawn around the ROI.

35. The apparatus according to claim 29, wherein a modified Laws' energy mask is convolved with said selected slice.

36. The apparatus according to claim 35, wherein said modified Laws' energy mask $Mod\_S5E5^T$ is:

$$\begin{bmatrix} 1 & -2 & 0 & -2 & -1 \\ 0 & 0 & 0 & 0 & 0 \\ 2 & -4 & 0 & -4 & -2 \\ 0 & 0 & 0 & 0 & 0 \\ 1 & -2 & 0 & -2 & -1 \end{bmatrix}.$$

37. The apparatus according to claim 29, wherein a Laws' energy mask $L5L5^T$ is convolved with said selected slice.

38. The apparatus according to claim 37, wherein said modified Laws' energy mask is:

$$L5L5^T = \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}.$$

39. The apparatus according to claim 29, wherein said ROI in said convolved energy image is the same as the ROI in the selected slice.

40. The apparatus according to claim 29, wherein said convolved energy image is normalized to have gray scale of 0 to 255.

41. The apparatus according to claim 29, wherein said background is removed from said histogram used to determine said initial threshold.

42. The apparatus according to claim 41, further comprising means for finding a first peak dependent upon said energy mask convolved with said original image.

43. The apparatus according to claim 42, further comprising means for finding a minimum point in the vicinity of said peak used as a cutoff point used as a threshold to remove background pixels.

44. The apparatus according to claim 43, further comprising means for finding a first peak in said histogram with said background removed and finding said initial threshold point (Ip), which corresponds to a specified percentage of the peak value.

45. The apparatus according to claim 44, wherein said specified percentage is 75%.

46. The apparatus according to claim 44, wherein said specified percentage can be varied depending on segmentation requirements.

47. The apparatus according to claim 44, further comprising means for binarizing said energy image using said initial threshold point Ip.

48. The apparatus according to claim 29, wherein said means for determining said final threshold comprises means for finding non-zero minimum and maximum histogram bins for each labeled component.

49. The apparatus according to claim 48, wherein said means for determining said final threshold comprises means for determining the minima of individual histograms.

50. The apparatus according to claim 49, wherein said means for determining said final threshold comprises means for finding the difference of maxima and minima as a vector R is found depending on the used energy mask.

51. The apparatus according to claim 50, wherein said vector R is:

If $L5L5^T$ is used, $R=[(P2_{max}-P1_{max})\ (P3_{max}-P2_{max})\ldots(PN_{max}-PN-1_{max})]$ If $Mod\_S5E5^T$ is used, $R=[(P2_{min}-P1_{min})\ (P3_{min}-P2_{min})\ldots(PN_{min}-PN-1_{min})].$ 52. The apparatus according to claim 51, further comprising means for sorting said vector R in descending order.

53. The apparatus according to claim 52, further comprising means for finding the index point of said vector R.

54. The apparatus according to claim 53, further comprising means for calculating said final threshold:

If $L5L5^T$ is used, $I_F=T^*(PM+1)_{max}$, where $T$ is a user defined parameter to control segmentation and has a default value, If $Mod\_S5E5^T$ is used, $I_F=T^*(PM+1)_{max}$, where $T$ is a user defined parameter to control segmentation and has a default value, where M is the index.

55. The apparatus according to claim 54, further comprising means for binarizing said energy image using said final threshold point $I_F$.

56. The apparatus according to claim 29, further comprising means for comparing said final segmentation of said slice with ground truth.

57. A computer program product comprising a non-transitory computer readable medium having recorded therein a computer program for execution on a computer to segment an infarct in a diffusion-weighted imaging (DWI) volume, said DWI volume comprising a plurality of slices, each slice comprising a plurality of pixels forming an original image, said computer program product comprising:
   computer program code means for selecting a Region of Interest (ROI) in at least one selected slice of said DWI volume containing an infarct in said original image, said ROI comprising said whole slice or at least a portion of said slice;
   computer program code means for selecting a suitable threshold for a minimum size of an infarct region, said threshold specifying a minimum number of pixels;
   computer program code means for convolving an energy mask with said selected slice, and normalizing said resulting energy image to occupy a predefined gray scale;
   computer program code means for selecting said ROI in said convolved energy image without a background region;
   computer program code means for determining the threshold for eliminating the background;
   computer program code means for determining an initial threshold using a histogram of said ROT of said slice without a background region, and performing an initial segmentation of said slice using said initial threshold;
   computer program code means for labeling individual components of said initial segmentation of said slice to identify regions present after threshold determination and binarization; and
   computer program code means for determining a final threshold using histograms of labeled components of said initial segmentation, and performing a final segmentation of said slice using said final threshold.

58. The computer program product according to claim 57, further comprising:
   computer program code means for reading said DWI volume into a computing system; and
   computer program code means for selecting at least one slice comprising an infarct.

59. The computer program product according to claim 58, wherein the dataset of said DWI volume comprises size, voxel size, and number of gray scales.

60. The computer program product according to claim 57, wherein said ROI is kept constant across two or more slices of said DWI volume.

61. The computer program product according to claim 57, further comprising computer program code means for varying said ROI based on at least one of position and size of an infarct in said slice of said DWI volume.

62. The computer program product according to claim 61, wherein said computer program code means for varying comprises a graphical interface tool that permits a perimeter to be drawn around the ROI.

63. The computer program product according to claim 57, wherein a modified Laws' energy mask is convolved with said selected slice.

64. The computer program product according to claim 63, wherein said modified Laws' energy mask Mod_S5E5$^T$ is:

$$\begin{bmatrix} 1 & -2 & 0 & -2 & -1 \\ 0 & 0 & 0 & 0 & 0 \\ 2 & -4 & 0 & -4 & -2 \\ 0 & 0 & 0 & 0 & 0 \\ 1 & -2 & 0 & -2 & -1 \end{bmatrix}.$$

65. The computer program product according to claim 57, wherein a Laws' energy mask L5L5$^T$ is convolved with said selected slice.

66. The computer program product according to claim 65, wherein said modified Laws' energy mask is:

$$L5L5^T = \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}.$$

67. The computer program product according to claim 57, wherein said ROI in said convolved energy image is the same as the ROI in the selected slice.

68. The computer program product according to claim 57, wherein said convolved energy image is normalized to have gray scale of 0 to 255.

69. The computer program product according to claim 57, wherein said background is removed from said histogram used to determine said initial threshold.

70. The computer program product according to claim 69, further comprising computer program code means for finding a first peak dependent upon said energy mask convolved with said original image.

71. The computer program product according to claim 70, further comprising computer program code means for finding a minimum point in the vicinity of said peak used as a cutoff point used as a threshold to remove background pixels.

72. The computer program product according to claim 71, further comprising computer program code means for finding a first peak in said histogram with said background removed and finding said initial threshold point (Ip), which corresponds to a specified percentage of the peak value.

73. The computer program product according to claim 72, wherein said specified percentage is 75%.

74. The computer program product according to claim 72, wherein said specified percentage can be varied depending on segmentation requirements.

75. The computer program product according to claim 72, further comprising computer program code means for binarizing said energy image using said initial threshold point Ip.

76. The computer program product according to claim 57, wherein said computer program code means for determining said final threshold comprises means for finding non-zero minimum and maximum histogram bins for each labeled component.

77. The computer program product according to claim 76, wherein said computer program code means for determining said final threshold comprises computer program code means for determining the minima of individual histograms.

78. The computer program product according to claim 77, wherein said computer program code means for determining said final threshold comprises computer program code means for finding the difference of maxima and minima as a vector R is found depending on the used energy mask.

79. The computer program product according to claim 78, wherein said vector R is:

If L5L5$^T$ is used, $R=[(P2_{max}-P1_{max})\ (P3_{max}-P2_{max})\ldots(PN_{max}-PN-1_{max})]$ If Mod_S5E5$^T$ is used, $R=[(P2_{min}-P1_{min})\ (P3_{min}-P2_{min})\ldots(PN_{min}-PN-1_{min})].$ 80. The computer program product according to claim 79, further comprising computer program code means for sorting said vector R in descending order.

81. The computer program product according to claim 80, further comprising computer program code means for finding the index point of said vector R.

82. The computer program product according to claim 81, further comprising computer program code means for calculating said final threshold:

If L5L5$^T$ is used, $I_F=T*(PM+1)_{max}$, where $T$ is a user defined parameter to control segmentation and has a default value, If Mod_S5E5$^T$ is used, $I_F=T*(PM+1)_{max}$, where $T$ is a user defined parameter to control segmentation and has a default value, where M is the index.

83. The computer program product according to claim 82, further comprising computer program code means for binarizing said energy image using said final threshold point $I_F$.

84. The computer program product according to claim 57, further comprising computer program code means for comparing said final segmentation of said slice with ground truth.

* * * * *